(12) United States Patent
Eriksson Järliden

(10) Patent No.: US 8,600,130 B2
(45) Date of Patent: Dec. 3, 2013

(54) 3D MEDICAL IMAGE SEGMENTATION

(75) Inventor: Andréas Lars Gunnar Eriksson Järliden, Stockholm (SE)

(73) Assignee: Elekta AB (publ), Stockholm (SE)

( * ) Notice: Subject to any disclaimer, the term of this patent is extended or adjusted under 35 U.S.C. 154(b) by 585 days.

(21) Appl. No.: 12/934,376

(22) PCT Filed: Mar. 25, 2008

(86) PCT No.: PCT/EP2008/002339
§ 371 (c)(1),
(2), (4) Date: Sep. 24, 2010

(87) PCT Pub. No.: WO2009/118020
PCT Pub. Date: Oct. 1, 2009

(65) Prior Publication Data
US 2011/0013818 A1    Jan. 20, 2011

(51) Int. Cl.
*G06K 9/34* (2006.01)

(52) U.S. Cl.
USPC .......................................... 382/128; 382/173

(58) Field of Classification Search
USPC .................. 382/128, 131, 154, 173, 180, 311
See application file for complete search history.

(56) References Cited

PUBLICATIONS

Levin et al., "Colorization using Optimization," Proc. SIGGRAPPH 2004, Aug. 2004, pp. 689-694.*
Grady, "Random Walks for Image Segmentation," IEEE Trans. on Pattern Analysis and Machine Intelligence, vol. 27, No. 11, Nov. 2006, pp. 1768-1783.*
Grau, et al., "Improved Watershed Transform for Medical Image Segmentation Using Prior Information," IEEE Transactions on Medical Imaging, IEEE Service Center, Piscataway, NJ, US, vol. 23, No. 4, Apr. 1, 2004, pp. 447-458, XP011110223. ISSN: 0278-0062.
Rousson, et al, "A General Framework for Image Segmentation Using Ordered Spatial Dependency" Medical Image Computing and Computer-Assisted Intervention—MICCAI 2006 Lecture Notes in Computer Science LNCS, Springer, Berlin, DE, vol. 4191, Jan. 1, 2006, pp. 848-355, XP19043550, ISBN: 978-3-540-44727-6.
Rohlfing., et al, "Quo Vadis, Atlas-Based Segmentation?," in The Handbook of Medical Image Analysis—vol. III: Registration Models, J. Suri, D. L. Wilson, and S. Laxminarayan, eds., ch. 11, pp. 435-486, Kluwer Academic / Plenum Publishers, New York, NY, Aug. 2005.
European Patent Office, International Search Report dated Dec. 12, 2008, PCT/EP2008/002339.

* cited by examiner

*Primary Examiner* — Andrew W Johns
(74) *Attorney, Agent, or Firm* — Sunstein Kann Murphy & Timbers LLP

(57) ABSTRACT

A treatment planning apparatus comprises a means for receiving a three dimensional representation of a patient, a means for displaying at least a part of the representation, a means for user-designation of sub-regions of the representation, and a computing means adapted to segment the representation into a region within an anatomical structure and a region outside the anatomical structure on the basis of the locations of the sub-regions, the degree of similarity of voxels to neighboring voxels in the representation, and a dataset representing an a priori assumption of the correct segmentation. •The dataset preferably comprises a probability distribution of each pixel being within the segmentation, e.g. obtained from a segmentation of a previous image of the patient, for example by smoothing the previous segmentation. The at least part of the representation comprises one or more sections through the representation, such as axial, sagittal and/or coronal views of the patient. The computing means can segment the representation by minimizing a function.

21 Claims, 3 Drawing Sheets

3D MEDICAL IMAGE SEGMENTATION

FIELD OF THE INVENTION

The present invention relates to a radiotherapeutic treatment planning apparatus, and to associated methods.

BACKGROUND ART

Radiotherapy operates by directing a beam of harmful radiation towards a tumour. To avoid causing unnecessary harm to the healthy tissue surrounding the tumour, the beam is collimated to a suitable cross-sectional shape and is directed towards the tumour from a variety of directions.

The apparatus for producing and controlling this beam has become steadily more complex and capable over time. Current external beam radiotherapy can now direct the beam towards the patient from a steadily rotating gantry while collimating the beam to a complex and varying cross-sectional shape that is tailored to deliver a varying dose rate to the patient to create a three-dimensional dose distribution that is maximised in the tumour, minimised in any nearby sensitive structures, and optimised in other tissue. Multiple-source radiotherapy apparatus is able to deliver precise doses to specific small volumes in the head and neck and upper shoulder areas of the patient and build these up to form similarly complex dose distributions by accurate indexing of the patient position.

To control these types of apparatus, treatment planning computers employ complex software to convert a desired dose distribution or a set of treatment constraints into a series of instructions for the physical movement and operation of the apparatus. These computers obviously need to know where the tumour is located; this information is obtained from internal scans of the patient, such as CT scans or the like.

This requires that a physician "segment" the scan, i.e. outlines the volume containing the tumour and volumes containing any sensitive structures such as the optic nerve, the digestive system, etc. Segmenting structures is therefore an important task in treatment planning applications, since the treatment planning process depends (inter alia) on the accuracy of segmentation for the quality of its results. There are many segmentation tools, spanning from completely manual ones to fully automatic ones.

The advantage of manual methods however is that they provide full (or at least much more) control over the result. The drawback is that it is very time consuming, difficult, and tedious to segment large 3D structures manually.

One drawback of many automatic methods—especially advanced ones—is the lack of control of the result. No method can be expected to be fully accurate in all cases, and when the result is not acceptable, there is often no way to correct it, or it must be corrected with purely manual tools—thereby cancelling some of the benefits of automatic methods.

Our GammaPlan™ and SurgiPlan™ tools currently provide manual outlining and a simple semi-automatic tool that works for certain images with good contrast, between target and background. These tools are useful, but could benefit from being more powerful.

SUMMARY OF THE INVENTION

The present invention therefore provides a treatment planning apparatus comprising a means for receiving a three dimensional representation of a patient, a means for displaying at least a part of the representation, a means for user-designation of sub-regions of the representation, and a computing means adapted to segment the representation into a region within an anatomical structure and a region outside the anatomical structure on the basis of the locations of the sub-regions, the degree of similarity of voxels to neighbouring voxels in the representation, and a dataset representing an a priori assumption of the correct segmentation.

The dataset preferably comprises a probability distribution, such as an array giving, for each pixel in the three dimensional representation of a patient, an a priori probability of the pixel being within the segmentation. This can be prepared in advance or can be obtained from a segmentation of a previous image of the patient, for example by smoothing the previous segmentation.

The at least part of the representation comprises one or more sections through the representation, such as axial, sagittal and/or coronal views of the patient.

The treatment planning apparatus preferably further comprises means for designating sub-regions as being inside the structure and/or means for designating sub-regions as being outside the structure.

The computing means can segment the representation by minimising a function of the type described herein, which begins with an array of values $I(x)$ where x is a specific pixel or voxel in which some values are unknown and some may be constrained to specific values, and produces an output array $I(x)$ in which the previously unknown values are calculated and any previously constrained values are unchanged. Suitably, $I(x)$ is 0 for voxels outside the segmented volume and 1 for voxels within the segmented volume. Ideally, the values of $I(x)$ are constrained in the sub-regions.

Preferably, the function is a cost function that is minimised by the computing means through variation of the values of $I(x)$. Those voxels where $I(x)$ is less than a preset threshold can be declared to lie outside the segmented volume, and vice-versa.

The technique can be extended from the segmentation of 3D (or 2D) scans to four-dimensional scans, i.e. time series 3D images. Such scans may be relevant in a range of areas, such as treatment planning in respect of cyclically moving tumours such as lung or mammary tumours.

BRIEF DESCRIPTION OF THE DRAWINGS

An embodiment of the present invention will now be described by way of example, with reference to the accompanying figures in which.

DETAILED DESCRIPTION OF THE EMBODIMENTS

Figure 1A:
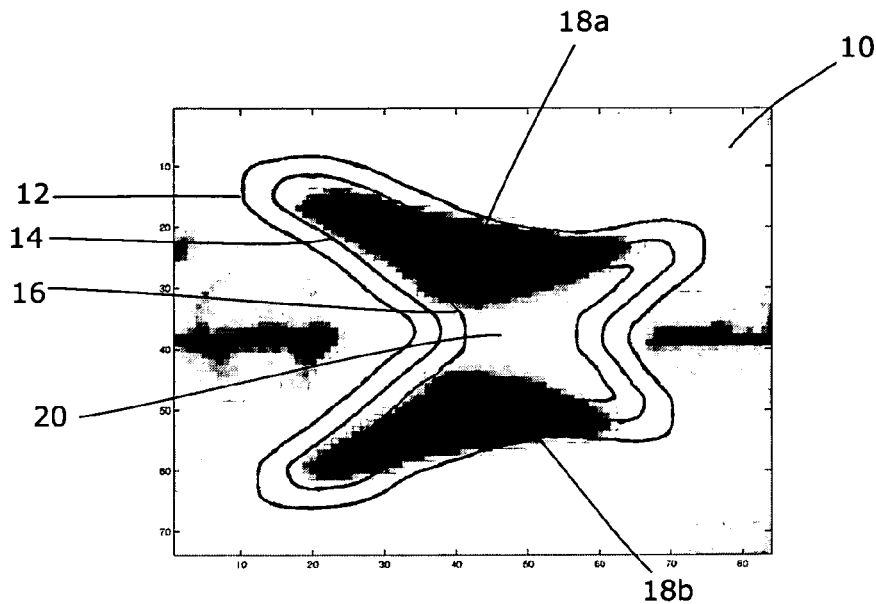
FIG. 1 A-C shows an example of a fully automatic segmentation and semi-automatic correction thereof.

We have developed a new segmentation technique, adapted from a method for image matting and colorization of images, which combines the best properties of manual and automatic methods. The method gives the user complete control of the result and yet automates much of the work so that only a minimum of user interaction is needed. It is described in detail in our copending application filed concurrently with this application and also entitled "Radiotherapeutic Treatment Planning Apparatus", the content of which is herein incorporated by reference.

With this technique, the user annotates the image with two types of scribbles, that mark the scribbled pixels as either "inside" or "outside". Each pixel in the region of interest is then allocated an inside or outside value. These values are initially unknown for all unannotated pixels, and constrained to (for example) 0 and 1 for outside and inside scribbles respectively. To compute the unknown values, a constraint is added that the value of each pixel should be similar to the values of the neighbouring pixels; the more similar (in intensity, typically) a pixel is to one of its neighbours, the more similar their inside/outside values should be. This problem is formulated as a cost function;

$$C(I) = \sum_x \left( I(x) - \sum_{y \in N(x)} \omega_{xy} I(y) \right)^2 \quad (1)$$

where I(x) is the inside/outside value of pixel x, N(x) is a neighbourhood of pixels around x, and $\omega_{xy}$ is a measure of how similar pixels x and y are that sums to one for a given x.

The squaring of the sum acts to ensure that all values are positive. Other functions could achieve this, such as a different (even) power or an abs(n) function.

For the $\omega_{xy}$ function, we use $$\omega_{xy} = e^{-\frac{(J(x)-J(y))^2}{2\sigma_x^2}} \quad (2)$$

where J(x) is the intensity (typically) of pixel x, and $\sigma_x^2$ is the variance of the intensity (typically) in a neighbourhood around pixel x.

We then normalize these values so that they sum to one for a given x using $$\omega_{xy} = \leftarrow \frac{\omega_{xy}}{\sum_y \omega_{xy}} \quad (3)$$

The system is solved for the set of inside/outside values $I_{min}$ that minimises C(I). The subset of pixels x for which $I_{min}(x)$ is greater than a preset value (for example 0.5) constitutes the segmentation result.

This technique has several advantages:

Very few annotations are needed; with good images, it is often enough to draw a single, quick inside scribble.

The user interface is just like paintbrushing in any drawing application and should be very familiar to users. As soon as the user stops drawing a stroke, the system computes all the unannotated pixels.

There is no need for accurate annotations: compared to outlining the border of a structure, drawing inside or outside scribbles can be done quickly and roughly.

The user can draw in any combination of views—e.g. axial, sagittal and coronal views—and thus use the best view for each part of the structure. Many other methods require all annotations to be in one view only, such as the axial view.

It works for difficult images. Many techniques are simply unusable for difficult images. With this technique, the user simply has to draw more annotations if the images are of poor quality.

Although this scribble based technique is very powerful, it can be improved further. For one thing, the method is not fully automatic; at least one inside scribble is always needed (and either one outside scribble, or an automatically applied constraint that the border of the region of interest is deemed to be "outside"). Also, since the algorithm has no knowledge of anatomy, it simply minimizes the cost function without considering whether the result is a realistic one.

One way to give knowledge of anatomy to the segmentation algorithm is to use an "atlas" of the structure to segment. This is a file that is registrable to the image of the patient—i.e. there is a known correlation between locations in the atlas and locations in the patient image—and which contains details of the likely shape of the structure that is being sought in the image. A probabilistic atlas might, for example, store a probability for each pixel that the pixel concerned is within the segmented volume. An atlas is usually (but not exclusively) generated by segmenting a structure on a representative selection of individuals.

Although there are many variations of atlas based segmentation algorithms, most can be divided into registration-based segmentation methods (reference 3) and methods using statistical shape models (reference 4) such as Active Shape Models or Active Appearance Models. Both these methods suffer from poor control over the end-result; besides changing obscure technical settings whose effect on the result is hard to predict, there is no way for the user to supply information to the algorithm to get a better result. Also, both of these techniques are very complex. The segmentation based methods rely on non-rigid registration with many degrees of freedom, which is hard to implement and hard to get robust. The statistical shape models are also complex to implement and use non-linear optimization with many degrees of freedom, which is both computationally expensive and hard to get robust. Another drawback is that statistical shape models can only capture variations that are present in the training set. Hence, the training sets must be large. In *Segmentation of the Liver using a 3D Statistical Shape Model* (reference 4), the authors conclude that their training set of 43 shapes is too small to segment the liver using this technique. Because of this, these techniques are unable to handle pathological cases such as when a nearby tumour deforms the structure to segment in an unusual way. It is, of course, the pathological cases which generally require such techniques; the patients that require treatment are those with pathological conditions, not healthy ones.

The invention extends the described scribble based technique with an atlas in a way that is both simple and powerful. Thereby, the technique becomes both automatic and gains knowledge about what is an expected result.

The invention introduces almost no extra complexity or computations compared to the basic scribble based technique and is considerably simpler than registration based segmentation or statistical shape models.

With the atlas, the scribble based technique can become fully automatic, although the user can still—if needed—semi-automatically correct the result. In that case, the atlas, the image, and the corrections from the user are taken into account to produce the new result. This is likely a unique thing for atlas segmentation methods.

With the original scribble based technique, the inside/outside value of a pixel is a combination of the neighbouring values weighted by the similarity to each neighbour, as described by the cost function (equation 1). In this invention, the cost function is changed to include the atlas so that each value is a combination of the neighbouring values and the corresponding atlas value. The atlas is first registered to the current image using (for example) an affine registration technique. Thus the atlas only has to account for the variability after registration. Note that an affine registration process is much simpler than the deformable registration used in registration-based segmentation methods.

To account for the atlas, the cost function is modified to $$C(I) = \sum_x \left( I(x) - \omega_a A(x) - \sum_{y \in N(x)} \omega_{xy} I(y) \right)^2 \quad (4)$$

where $\omega_a + \Sigma_y \omega_{xy} = 1$, and $A(x)$ is the inside/outside value of pixel x given by the atlas. $A(x)$ should be a probabilistic atlas, so that (assuming outside and inside scribbles are given the inside/outside values 0 and 1) $A(x)$ is the fraction of images constituting the atlas where pixel x is inside the structure. With this change, the cost function describes two goals: that each value should be close to its similar neighbours (like before) and that each value should be close to the atlas value. By adjusting $\omega_a$, one can adjust how the algorithm should prioritize between these goals. $\omega_a$ is kept constant for all pixels, but it should be scaled depending on the resolution of the image. This is because the image based costs depend on the resolution while the atlas costs do not; hence, $\omega_a$ must be changed to keep the relation between the two costs constant. This can easily be accounted for so that the method becomes resolution invariant.

With the original method, at least one inside scribble and one outside scribble is needed; otherwise, setting all the values to the same value minimizes the cost function. With the atlas in the cost function, however, it is possible that a satisfactory result will be achieved with no annotations from the user. Thus, a result can be computed automatically from the image and the atlas. If the automatic result is not fully accurate, the user can then simply correct the result by adding additional scribbles. The next result is then based upon the atlas, the current image, and the user annotations.

Such a case is shown in FIG. 1, an example showing a fully automatic segmentation and semi-automatic correction thereof. FIG. 1a shows the current image 10 over which we have superimposed the 10% isocurve 12, the 50% isocurve 14, and the 90% isocurve 16 of the atlas. These curves represent the opinion of the atlas as to where the structure is likely to be; the curves are essentially statements that in at least the relevant percentage of instances, pixels within that curve were found to be within the structure. An artificial and purposely bad atlas is shown in this example, so that correction of the segmentation can be illustrated. Generally, the isocurves reflect the shape of the visible structure 18, but (in this case) fail to reflect the fact that this is divided into two ventricles 18a, 18b with a gap 20 between.

Figure 1B:
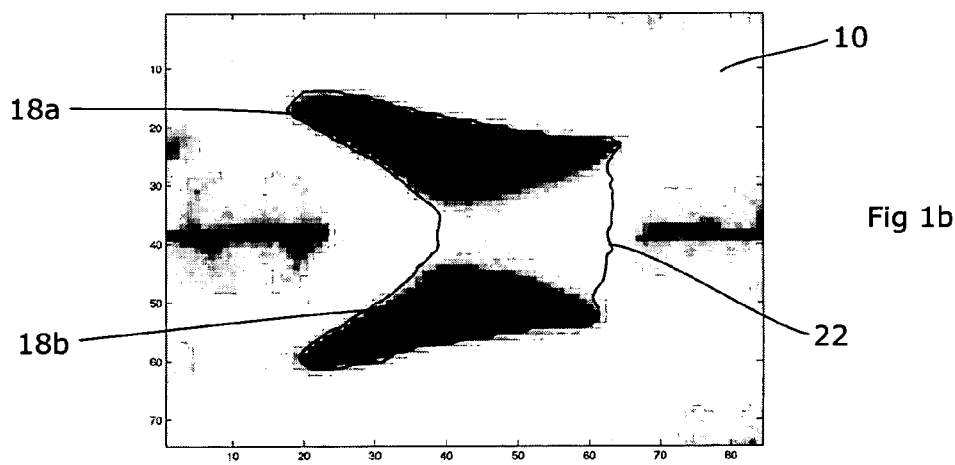
Figure 1C:
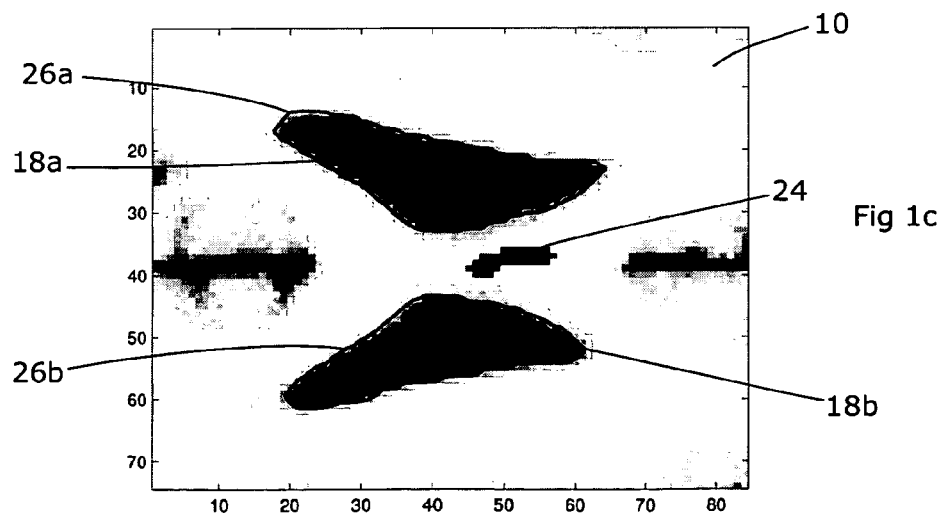

FIG. 1b shows the automatic segmentation result 22, based on the current image 10 and the atlas—i.e. without any scribbles being provided by the operator. The result 22 is generally accurate except that it connects the two ventricles 18a, 18b, based upon the guidance provided by the atlas. To correct this, the user draws the small outside scribble 24 between the ventricles (shown in FIG. 1c), and the system re-computes the segmentation to produce a new result 26 based upon the current image 10, the atlas, and the scribble 24. The final, correct result 26 is shown in FIG. 1c, and correctly divides the segmentation result into two ventricles 26a, 26b reflecting the ventricles 18a, 18b of the structure 18.

Figure 2:
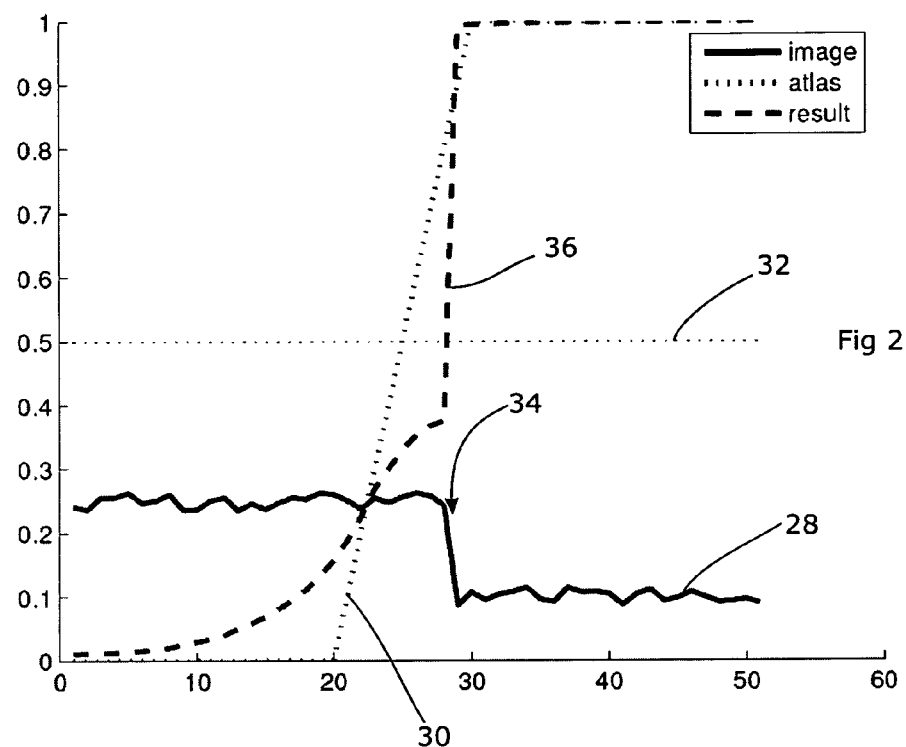
FIG. 2 shows a one-dimensional example of an idealised situation.
Figure 3:
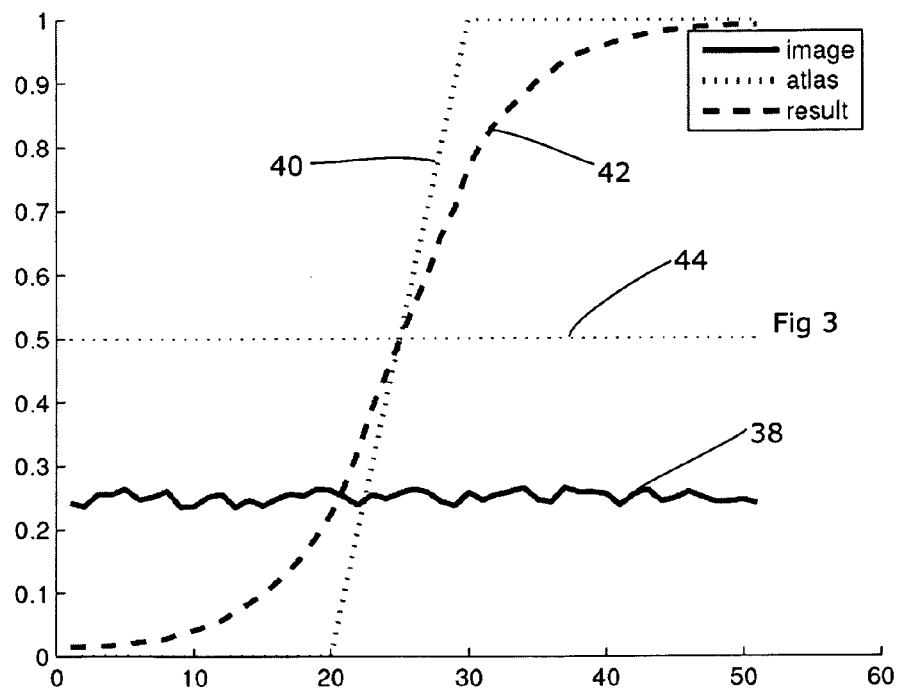
FIG. 3 shows a further idealised one-dimensional example in which there are no clear image features.
Figure 4:
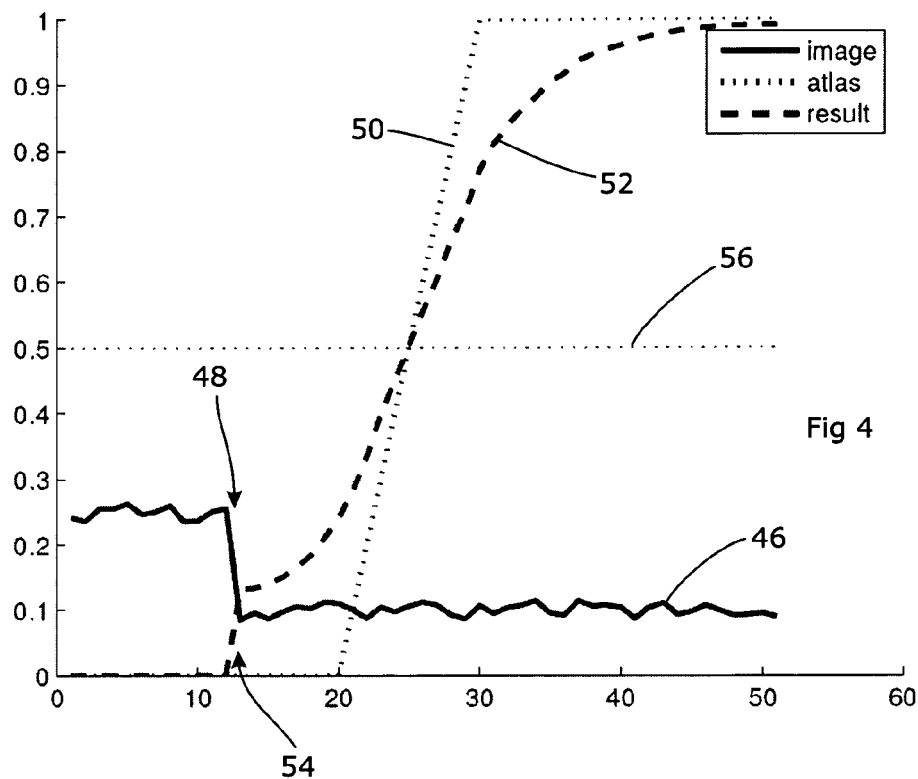
FIG. 4 shows a one-dimensional example illustrating how an image feature outside the plausible region suggested by the atlas is handled.
Figure 5:
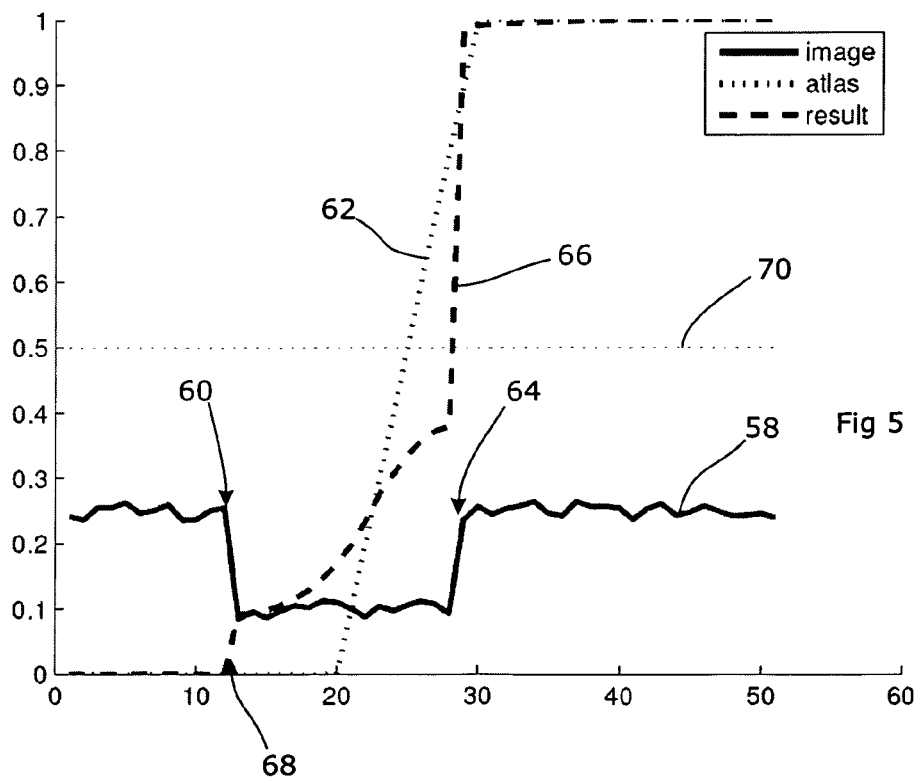
FIG. 5 shows a one-dimensional example demonstrating that the result agrees with the image feature inside the plausible range of the atlas despite a distant edge.

Despite the simplicity of this approach, it has several useful properties. The ability to correct the result without difficulty is described above in relation to FIG. 1. FIGS. 2 to 5 illustrate other aspects of the working of the invention in the context of a one-dimensional example. Clearly, in practice a three-dimensional data set will be employed, but for the purpose of explanation herein a one-dimensional example suffices and is easier to illustrate with clarity. Specifically, FIG. 2 illustrates the typical case with an image feature inside the plausible range of the atlas, FIG. 3 shows how situations without prominent image features are handled, and FIGS. 4 and 5 show how image features outside the plausible range of the atlas are ignored.

FIG. 2 thus shows a one-dimensional example of an idealized situation. The solid line 28 plots the variation in image intensity (y axis) along the one dimension (x axis) of the image. The dotted line 30 is the probabilistic atlas, and it shows that the median shape is inside for values of x greater than 25, since the atlas crosses the 0.5 threshold 32 at that point. However, the atlas 30 reflects that in practice the border can be anywhere between x=20 and x=30, by rising steadily from zero to one between these ranges. In this case, there is a step change 34 in the image intensity between x=28 and x=29. This suggests that for this particular image, the inside/outside border of the segmentation should be around x=28.5. This is indeed the case in the computed result 36, which passes 0.5 at the same position as the sharp image change.

FIG. 3 is an example showing the working of the invention when there are no clear image features. Thus, the image intensity 38 is generally flat with only small local variations. The same atlas 40 is also shown. The computed result 42 passes the 0.5 threshold 44 at the same position as the atlas. Hence, the result corresponds exactly to the median atlas result, as might be expected when the image effectively provides no guidance.

FIG. 4 is an example showing how an image feature outside the plausible region suggested by the atlas is handled. Thus the image intensity 46 shows a step change 48, but one that is outside the region suggested by the atlas 50. In the vicinity of the step change 48, the atlas 50 is still zero and has not yet begun to rise. The remainder of the image 46 is generally flat. The computed result 52 agrees fully with the median atlas result since there are no clear image features inside the atlas transition region; the result has not been distracted by the distant image feature 48. It is worth noting that the result 52 shows a small step change 54 at the location of the step change 48 in the image intensity, but this is not large enough to rise above the 0.5 threshold 56 since the atlas 50 is weighted against this location.

FIG. 5 is an example showing that the result agrees with an image feature that is inside the plausible range of the atlas, notwithstanding a distant edge. Thus, in this case the image intensity 58 includes two step changes; a first step change 60 that is outside the plausible range suggested by the atlas 62 and a second step change 64 that is within the plausible range. The computed result 66 therefore shows a small rise 68 at the first step change 60, but one that is not large enough to cross the 0.5 threshold 70. As the atlas value 62 begins to rise from x=20 onwards, the computed result 66 also rises but it is only at the location of the second step change 64 that the result 66 crosses the 0.5 threshold 70. Thus, the segmentation result correctly identifies the second step change 64 as the boundary and ignores the first step change 60.

The ability to easily correct the result is probably however the most important advantage of this technique. Automatic techniques that do not provide easy correction of the result must necessarily be close to 100% accurate and robust. However, if inaccurate results can be corrected in a few seconds, such total accuracy and robustness is much less important. Given that 100% accuracy and robustness is in all likelihood impossible to achieve in practice, this is an important advance.

A slightly different use of this invention is in the segmentation of follow-up images—for example to track the shrinkage of a tumour. An atlas specific to that patient could be generated by smoothing a the segmentation result of a previous image or images of that patient.

In the same way, the method can be employed to segment a 4D dataset such as a time series of a 3D image.

REFERENCES (1) Levin, A., Lischinski, D., and Weiss, Y. 2006. A Closed Form Solution to Natural Image Matting. In *Proceedings of the 2006 IEEE Computer Society Conference on Computer Vision and, Pattern Recognition—Volume* 1 (Jun. 17-22, 2006). CVPR. IEEE Computer Society, Washington, D.C., 61-68.

(2) Levin, A., Lischinski, D., and Weiss, Y. 2004. Colorization using optimization. In *ACM SIGGRAPH* 2004 *Papers* (Los Angeles, Calif., Aug. 8-12, 2004). J. Marks, Ed. SIGGRAPH '04. ACM Press, New York, N.Y., 689-694.

(3) Rohlfing T, Brandt R, Menzel R, Russakoff D B, Mauerer C R Jr. Quo ads, Atlas-Based Segmentation? Chapter 11 in: *Handbook of Biomedical Image Analysis—Vol. III: Registration Models.* (Editors: Suri J. S., Wilson D. L., Laximinarayan S.). New York: Bluer Academic/Plenum Publishers, 2005; 435-470, www.stanford.edu/~rohlfing/publications/2005-rohlfing-chapter-quo_vadis_atlas_based_segmentation.pdf (4) Hans Lamecker, Thomas Lange, Martin Seebass: *Segmentation of the Liver using a 3D Statistical Shape Model*, http://www.zib.eu/Publications/Reports/ZR-04-09.pdf.

It will of course be understood that many variations may be made to the above-described embodiment without departing from the scope of the present invention.

The invention claimed is:

1. A treatment planning apparatus comprising:
   a means for receiving a three dimensional representation of a patient,
   a means for displaying at least a part of the representation,
   a means for user-designation of sub-regions of the representation, and
   a computing means adapted to segment the representation into a region within an anatomical structure and a region outside the anatomical structure on the basis of the locations of the sub-regions, the degree of similarity of pixels to neighbouring pixels in the representation, and a dataset representing an a priori assumption of the correct anatomical structure.

2. A treatment planning apparatus according to claim 1 in which the dataset comprises a probability distribution.

3. A treatment planning apparatus according to claim 2 in which the probability distribution is an array giving, for each pixel in the three dimensional representation of a patient, an a priori probability of the pixel being within the segmentation.

4. A treatment planning apparatus according to claim 1 in which the dataset is obtained from a segmentation of a previous image of the patient.

5. A treatment planning apparatus according to claim 1 in which the at least part of the representation comprises one or more sections through the representation.

6. A treatment planning apparatus according to claim 5 in which the sections are selected from the group consisting of axial, sagittal and coronal views of the patient.

7. A treatment planning apparatus according to claim 1 further comprising means for designating sub-regions as being inside the structure.

8. A treatment planning apparatus according to claim 1 further comprising means for designating sub-regions as being outside the structure.

9. A treatment planning apparatus comprising:
   a means for receiving a three dimensional representation of a patient,
   a means for displaying at least a part of the representation,
   a means for user-designation of sub-regions of the representation, and
   a computing means adapted to segment the representation into a region within an anatomical structure and a region outside the anatomical structure on the basis of the locations of the sub-regions, the degree of similarity of pixels to neighbouring pixels in the representation, and a dataset representing an a priori assumption of the correct segmentation and obtained from a smoothed segmentation of a previous image of the patient.

10. A treatment planning apparatus comprising:
    a means for receiving a three dimensional representation of a patient,
    a means for displaying at least a part of the representation,
    a means for user-designation of sub-regions of the representation, and
    a computing means adapted to segment the representation into a region within an anatomical structure and a region outside the anatomical structure on the basis of the locations of the sub-regions, the degree of similarity of pixels to neighbouring pixels in the representation, and a dataset representing an a priori assumption of the correct segmentation, and by minimising a function having the form $$C(I) = \sum_x f\left(I(x) - \omega_a A(x) - \sum_{y \in N(x)} \omega_{xy} I(y)\right),$$

where $I(x)$ is an inside/outside value of pixel x, $N(x)$ is a neighbourhood of pixels around x, and $\omega_x$ is a measure of the similarity of pixels x and y, $\omega_a$ is a scalar, and $A(x)$ is the inside/outside value of pixel x given by the atlas.

11. A treatment planning apparatus according to claim 10 in which $\omega_a + \Sigma_y \omega_{xy}$ sums to one for a given x.

12. A treatment planning apparatus according to claim 10 in which the function to be minimised has the form $$C(I) = \sum_x f\left(I(x) - \omega_a A(x) - \sum_{y \in N(x)} \omega_{xy} I(y)\right)^n$$

wherein n is an even number.

13. A treatment planning apparatus according to claim 12 in which n is 2.

14. A treatment planning apparatus according to claim 10 in which $I(x)$ is less than a preset threshold of 0.5 for pixels outside the segmented volume.

15. A treatment planning apparatus according to claim 10 in which $I(x)$ is greater than a preset threshold of 0.5 for pixels within the segmented volume.

16. A method of segmenting a three dimensional representation of a patient, comprising the steps of:
- displaying at least a part of the representation,
- designating sub-regions of the representation,
- providing a dataset representing an a priori assumption of the correct anatomical structure, and
- segmenting the representation into a region within an anatomical structure and a region outside the anatomical structure on the basis of the locations of the sub-regions, the degree of similarity of pixels to neighbouring pixels in the representation, and the dataset.

17. A method according to claim 16 in which the dataset comprises a probability distribution.

18. A method according to claim 17 in which the probability distribution is an array giving, for each pixel in the three dimensional representation of a patient, an a priori probability of the pixel being within the segmentation.

19. A method according to claim 17 in which the dataset is obtained from a segmentation of a previous image of the patient.

20. A method of segmenting a three dimensional representation of a patient comprising the steps of:
- displaying at least a part of the representation,
- designating sub-regions of the representation,
- providing a dataset representing an a priori assumption of the correct segmentation and
- segmenting the representation into a region within an anatomical structure and a region outside the anatomical structure on the basis of the locations of the sub-regions, the degree of similarity of voxels to neighbouring voxels in the representation, and the dataset,
- wherein the dataset is obtained from a smoothed segmentation of a previous image of the patient.

21. A method of segmenting a three dimensional representation of a patient comprising the steps of:
- displaying at least a part of the representation,
- designating sub-regions of the representation,
- providing a dataset representing an a priori assumption of the correct segmentation and
- segmenting the representation into a region within an anatomical structure and a region outside the anatomical structure on the basis of the locations of the sub-regions, the degree of similarity of pixels to neighbouring pixels in the representation, and the dataset, and by minimising a function having a function having the form $$C(I) = \sum_x f\left(I(x) - \omega_a A(x) - \sum_{y \in N(x)} \omega_{xy} I(y)\right),$$

where $I(x)$ is an inside/outside value of pixel x, $N(x)$ is a neighbourhood of pixels around x, and $\omega_x$ is a measure of the similarity of pixels x and y, $\omega_a$ is a scalar, and $A(x)$ is the inside/outside value of pixel x given by the atlas.

* * * * *